H. H. VOSBURGH.
SEAT ATTACHMENT.
APPLICATION FILED APR. 1, 1911. RENEWED FEB. 21, 1913.
1,059,791.
Patented Apr. 22, 1913.
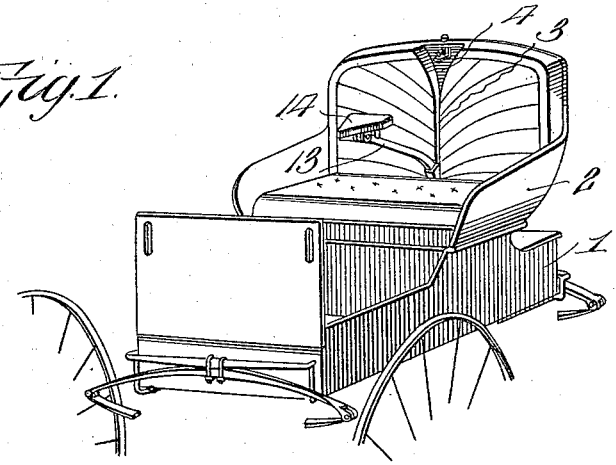
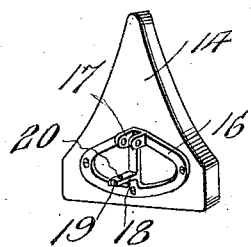
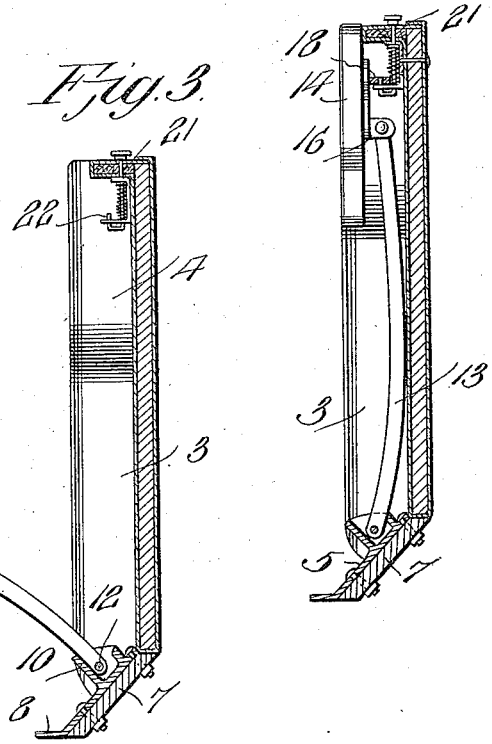
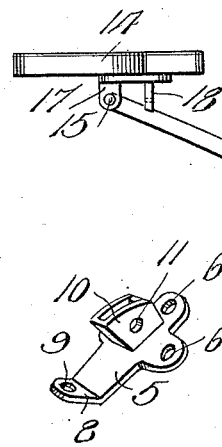
Inventor
Henri H. Vosburgh,
By Victor J. Evans
Attorney
Witnesses
Frank Hough

UNITED STATES PATENT OFFICE.

HENRI H. VOSBURGH, OF BELLE PLAINE, SASKATCHEWAN, CANADA.

SEAT ATTACHMENT.

1,059,791.          Specification of Letters Patent.      Patented Apr. 22, 1913.

Application filed April 1, 1911, Serial No. 618,685. Renewed February 21, 1913. Serial No. 750,040.

*To all whom it may concern:*

Be it known that I, HENRI H. VOSBURGH, subject of the King of Great Britain, residing at Belle Plaine, in the Province of Saskatchewan and Dominion of Canada, have invented new and useful Improvements in Seat Attachments, of which the following is a specification.

This invention relates to seat attachments for automobiles and other vehicles, and one of the principal objects of the same is to provide a seat for a child or for a third person which can be swung down from the back of the vehicle seat in position for use and which can be swung back out of the way to form a continuation of the back cushion.

Another object of the invention is to provide a simple, convenient and strong seat connected by a lever to the bottom of the back of the vehicle seat and adapted to be swung upward entirely out of the way when not in use.

These and other objects may be attained by means of the construction illustrated in the accompanying drawing, in which:—

Figure 1 is a perspective view of a buggy body and seat, showing my seat attachment swung out in position for use. Fig. 2 is a perspective view looking at the underside of the seat, said seat being detached from the lever. Fig. 3 is a vertical sectional view taken through the vehicle seat and showing the attachment swung down in position for use. Fig. 4 is a similar view showing the attachment swung back and connected to the vehicle seat in a position out of the way. Fig. 5 is a detail perspective view of the casting to which the lever is pivoted.

Referring to the drawing for a more specific description of my invention, the numeral 1 designates a wheeled vehicle, and 2 is the seat thereof. The back of the seat is divided by a space 3, and the upper portion of the two halves of the seat are removed to form a substantially triangular space 4.

The child's seat comprises a casting 5 provided with bolt openings 6, by means of which the casting is held to the inclined bottom board 7 of the seat back, and a forwardly projecting lug 8 is provided with a bolt hole 9 by means of which the casting is bolted to the bottom of the seat. A hollow pintle bearing 10 provided with pintle holes 11 forms a part of the casting 5, and pivoted upon the pintle 12 is a curved lever 13. To the outer end of the lever 13 a seat 14 is pivoted at 15, said seat being substantially triangular in form and adapted to fit in the space 4 between the upper portion of the seat back sections of the vehicle. Underneath the seat 14 is a skeleton plate 16 having spaced lugs 17, between which the lever 13 is pivoted on the pin 15. A stop lug 18 provided with a notch 19 projects downwardly from the skeleton plate 16, the notch 19 in said lug adapted to fit upon the edge of the lever 13, as shown in Fig. 3, to hold the seat 14 in a horizontal position. The lug 18 is also provided with a perforation 20, and a spring bolt 21 mounted in the space 4 between the seat sections of the vehicle is provided with an upwardly extending point 22 designed to pass through the opening 20 in the plate 16 to hold the seat 14 in elevated position and out of the way when not in use.

From the foregoing it will be obvious that my invention is of simple construction, can be quickly thrown down whenever required for use and when not required is entirely out of the way and adds little to the cost of the vehicle and does not detract from the general appearance of the same.

Having thus described the invention, what is claimed as new, is:—

1. A buggy back having a recess therein, a lug secured to said buggy back, a rod pivoted at its lower end to said lug and adapted to be held in a forwardly inclined position by said lug, a U-shaped guide secured to the lower end of the back, a bolt movable through said guide having an upturned end, a spring adapted to hold said upturned end normally elevated, and a seat pivoted to the upper end of said arm and having a stop adapted to hold said seat in a horizontal position on said arm and adapted to engage the upturned end of said bolt and be held thereby in the recess of said back.

2. In combination with a buggy having a seat and back divided into two sections, said sections being cut-away at the top to provide an enlarged recess therein, a U-shaped guide member arranged in said recess, a spring pressed bolt mounted in said guide, a child's seat comprising a casing, a lever pivoted in said casing, a seat pivoted to said lever, a stop lug carried by said seat and adapted to engage said lever to hold said seat in an operative position, said seat being adapted to be swung into said recess when not in use, at which time said stop lug is moved within said guide and engaged by said bolt, substantially as and for the purpose specified.

3. In combination with a buggy having a seat and back divided into two sections, a U-shaped guide arranged between said sections, a spring pressed latch mounted in said guide, a lever pivoted at its lower end between said sections and directly below said latch, a child's seat, a plate secured to the underside of said seat and provided with spaced ears adapted to be pivoted to the upper end of said lever, a lug formed on said plate and disposed rearwardly of said ears, said lug having a notched outer end adapted to engage said lever when said seat is moved to an operative position and having an opening adjacent said notch adapted to receive said latch to hold said seat in a folded position.

In testimony whereof I affix my signature in presence of two witnesses.

HENRI H. VOSBURGH.

Witnesses:
W. KESTER,
CHAS. JENKIN.

Copies of this patent may be obtained for five cents each, by addressing the "Commissioner of Patents, Washington, D. C."